(12) United States Patent
Diez et al.

(10) Patent No.: US 8,157,155 B2
(45) Date of Patent: Apr. 17, 2012

(54) AUTOMATED ASSEMBLY AND WELDING OF STRUCTURES

(75) Inventors: Fernando Martinez Diez, Dunlap, IL (US); Keith Alan Herman, Peoria, IL (US); Huijun Wang, Peoria, IL (US); Howard W. Ludewig, Groveland, IL (US); Mathew Mark Robinson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 12/314,219

(22) Filed: Dec. 5, 2008

(65) Prior Publication Data
US 2009/0249606 A1 Oct. 8, 2009

Related U.S. Application Data

(63) Continuation-in-part of application No. 12/078,675, filed on Apr. 3, 2008.

(51) Int. Cl.
*B23K 37/04* (2006.01)
(52) U.S. Cl. .................................................. 228/44.3
(58) Field of Classification Search .............. 228/102, 228/103, 178, 182, 4.1, 6.1, 8, 9
See application file for complete search history.

(56) References Cited

U.S. PATENT DOCUMENTS

| | | |
|---|---|---|
| 2,289,458 A | 11/1940 | Rodgers |
| 2,823,340 A | 2/1956 | Pierce |
| 2,866,889 A | 12/1958 | Dempsey |
| 3,491,995 A | 1/1970 | Taraba |
| 3,577,625 A | 5/1971 | Schiedel |
| 3,775,717 A | 11/1973 | Braillon |
| 4,105,925 A | 8/1978 | Rossol et al. |
| 4,256,947 A | 3/1981 | De Candia |
| 4,468,648 A | 8/1984 | Uchikune |
| 4,613,269 A | 9/1986 | Wilder et al. |
| 4,628,578 A | 12/1986 | Yajima |
| 4,654,949 A | 4/1987 | Pryor |
| 4,679,021 A | 7/1987 | Braillon |
| 4,704,694 A | 11/1987 | Czerniejewski |
| 4,774,757 A | 10/1988 | Sakamoto et al. |
| 4,811,891 A * | 3/1989 | Yamaoka et al. ............. 228/182 |
| 5,270,678 A | 12/1993 | Gambut et al. |
| 5,272,805 A | 12/1993 | Akeel et al. |
| 5,350,269 A | 9/1994 | Azuma et al. |
| 5,371,337 A * | 12/1994 | Campbell et al. ........ 219/121.63 |

(Continued)

OTHER PUBLICATIONS

"A-Pod Versatile Clamping for Today's Machining", Internet Sales Flyer, Alpha Workholding Solutions, Hartland, Wisconsin, www.alphaworkholding.com/system/pdfs/A-PodSales.pdf.

*Primary Examiner* — David Sample
*Assistant Examiner* — Megha Mehta
(74) *Attorney, Agent, or Firm* — Finnegan, Henderson, Farabow, Garrett & Dunner LLP

(57) ABSTRACT

A system for automated assembly and welding is disclosed. The system includes a pallet for receiving incoming workpieces; a workpiece holder having a plurality of electromagnets; a handling robot configured to transport incoming workpieces from the pallet to the workpiece holder; and a controller in communication with the workpiece holder and the handling robot. The controller is configured to determine an orientation of a workpiece positioned on the workpiece holder, and to selectively adjust an activation state of one or more electromagnets of the workpiece holder based upon the orientation of the workpiece. A method of assembling and welding workpieces is also disclosed.

10 Claims, 7 Drawing Sheets

U.S. PATENT DOCUMENTS

| | | |
|---|---|---|
| 5,380,978 A | 1/1995 | Pryor |
| 5,506,682 A | 4/1996 | Pryor |
| 5,539,975 A | 7/1996 | Kukuljan et al. |
| 6,002,317 A | 12/1999 | Pignataro |
| 6,163,946 A | 12/2000 | Pryor |
| 6,278,350 B1 | 8/2001 | Dörner |
| 6,301,763 B1 | 10/2001 | Pryor |
| 6,314,631 B1 | 11/2001 | Pryor |
| 6,317,953 B1 | 11/2001 | Pryor |
| 6,355,491 B1 * | 3/2002 | Zhou et al. .................. 436/518 |
| 6,489,871 B1 | 12/2002 | Barton |
| 7,015,780 B2 | 3/2006 | Bernstein et al. |
| 7,038,566 B2 | 5/2006 | Cardone |
| 7,161,451 B2 | 1/2007 | Shen |
| 7,162,799 B2 | 1/2007 | Moore et al. |
| 7,319,375 B2 | 1/2008 | Roy |
| 2005/0029326 A1 | 2/2005 | Henrikson |
| 2006/0107507 A1 | 5/2006 | Brose et al. |
| 2007/0039155 A1 | 2/2007 | Savoy |
| 2007/0290780 A1 | 12/2007 | Tiberghien et al. |

* cited by examiner

AUTOMATED ASSEMBLY AND WELDING OF STRUCTURES

RELATED APPLICATION

This application is a continuation-in-part of U.S. application Ser. No. 12/078,675, filed Apr. 3, 2008, the entire contents of which are incorporated herein by reference.

TECHNICAL FIELD

The present disclosure relates generally to automated manufacturing, and, more particularly, to an automated assembly and welding system and a method for automated assembly and welding of structures.

BACKGROUND

Robotic welding machines have been used across various industries for the purpose of assembling and joining components. For example, robotic welding machines have been used to weld vehicle frame components together and to weld body panels to welded vehicle frames. Typically, human-operated cranes are used to transport various components to an assembly station. The components are mounted on a fixture that positions the components in a desired welding orientation. A robotic welding machine is then programmed to weld the components together as they are held by the fixture. Although the robotic welding machine improves the efficiency and accuracy of the welding process itself, there are often delays and errors that result from the human-operated fixturing process. As a result, several attempts have been made at more fully automating the component transport, fixturing, and joining processes.

One example of an automated assembly system is described in U.S. Pat. No. 5,272,805 (the '805 patent) issued to Akeel, et al. on Dec. 28, 1993. The automated assembly system of the '805 patent uses automated guided vehicles to transport desired components to an assembly station, where a material handling robot is used to place the components on a fixturing platform. The fixturing platform includes a plurality of programmable robotic locators, which are programmed to receive and clamp the particular components positioned there by the material handling robot. Once the desired components have been clamped into the programmable robotic locators, a processing robot is used to weld the clamped components together.

Although the system of the '805 patent may help minimize the delays and errors associated with human fixturing, it may not be able to properly fixture certain shapes of components or consecutive components of varying sizes. Specifically, the programmable robotic locaters of the '805 patent are disposed in certain locations of the fixturing platform and they are programmed to orient themselves with respect to a particular assembly. Therefore, they may be unable to accommodate components that do not particularly match the design of the programmable robotic locators installed on the platform. Moreover, the system of the '805 patent may require the use of numerous fixturing platforms along a manufacturing line, each fixturing platform having a particular installation of programmable robotic locators, which are programmed to clamp a particular assembly of components.

The disclosed systems and methods are directed to overcoming one or more of the shortcomings in the existing technology.

SUMMARY

In one aspect, the present disclosure is directed to a system for assembling workpieces. The system includes a pallet for receiving incoming workpieces; a workpiece holder having a plurality of electromagnets; a handling robot configured to transport incoming workpieces from the pallet to the workpiece holder; and a controller in communication with the workpiece holder and the handling robot. The controller is configured to determine an orientation of a workpiece positioned on the workpiece holder, and to selectively adjust an activation state of one or more electromagnets of the workpiece holder based upon the orientation of the workpiece.

In another aspect, the present disclosure is directed to a method of assembling workpieces. The method includes positioning a first workpiece on a work holding system having a plurality of electromagnets; positioning a second workpiece on the work holding system; selectively activating the electromagnets to hold the first and second workpieces to the work holding system; welding the first and second workpieces together; and inspecting the first and second workpieces once they are welded together. The electromagnets are selectively adjusted based upon positions of the first and second workpieces and based upon positions of a welding tool used to weld the first and second workpieces together.

In yet another aspect, the present disclosure is directed to a method of assembling workpieces. The method includes positioning a plurality of workpieces on a work holding system having a plurality of electromagnets; selectively activating the electromagnets to hold the workpieces to the work holding system; retrieving a camera to inspect the workpieces held to the work holding system; retrieving a welding torch to weld the workpieces together; and retrieving a camera to inspect the workpieces once they are welded together. The electromagnets are selectively adjusted based upon positions of the workpieces and based upon positions of the welding torch as it welds the workpieces together.

DETAILED DESCRIPTION

Figure 1:
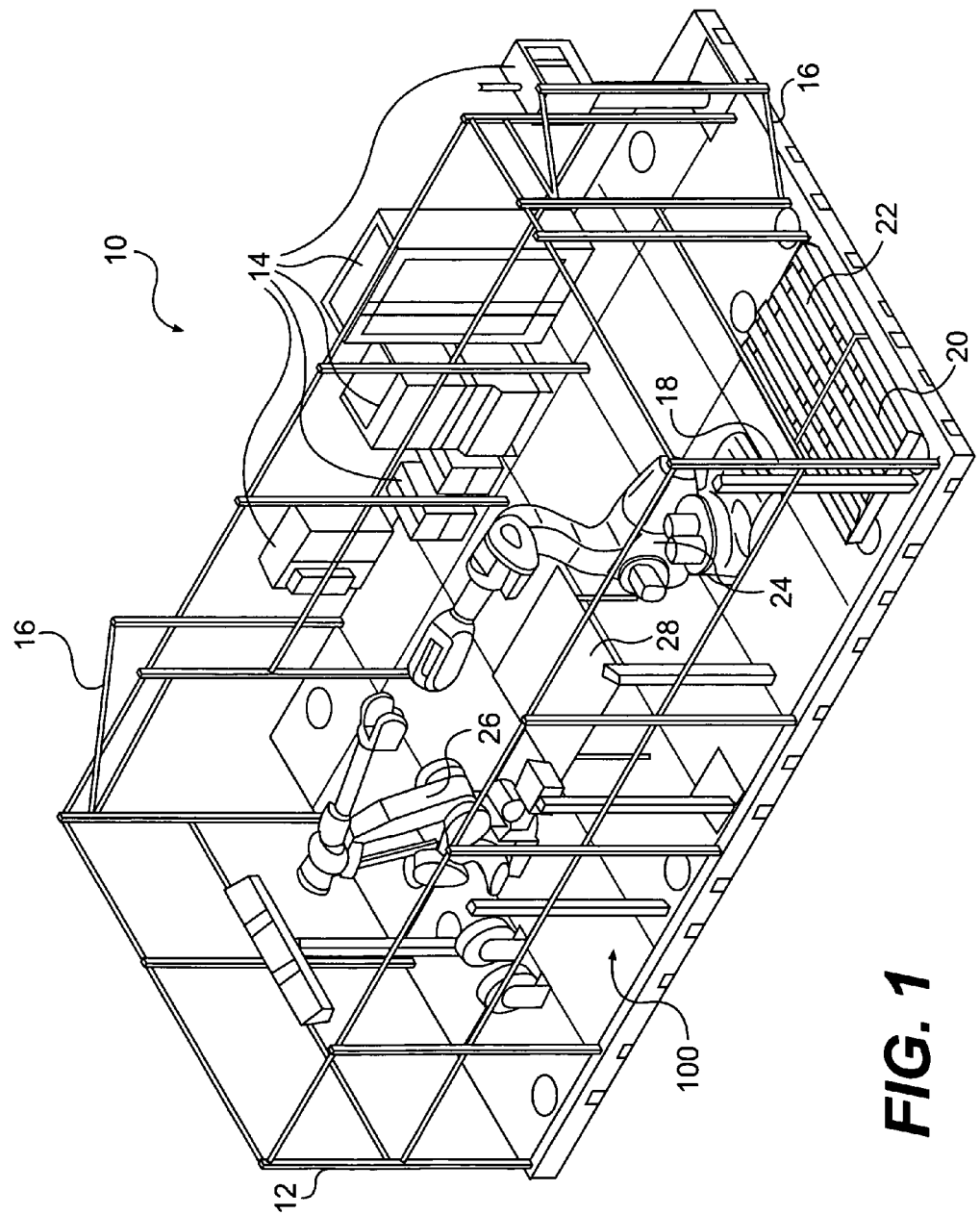
FIG. 1 is a perspective view of an exemplary disclosed manufacturing cell.

FIG. 1 illustrates an exemplary manufacturing cell 10. Manufacturing cell 10 may include an enclosure 12, in which manufacturing equipment may be disposed for handling, manipulating, machining, joining, measuring, and/or inspecting workpieces. Manufacturing cell 10 may include a control system 14 disposed outside of enclosure 12, by which one or more operators may program and control manufacturing equipment inside enclosure 12. Enclosure 12 may include a plurality of interlocking gates 16 through which installers, operators, and maintenance workers may enter and exit manufacturing cell 10. Enclosure 12 may also include an interlocking, vertical-sliding load door 18, through which pallets, workpieces, and/or manufacturing equipment may enter and exit manufacturing cell 10. Although control system 14 is depicted outside of enclosure 12, control system 14 may also, or alternatively, be disposed inside of enclosure 12. Moreover, numerous additional and/or alternative entry- and exit-ways are contemplated besides the exemplary disclosed interlocking gates 16 and vertical-sliding load door 18, as will be appreciated by one of skill in the art.

As shown in FIG. 1, manufacturing cell 10 may include an incoming workpiece pallet 20 and an outgoing workpiece pallet 22 disposed adjacent to vertical-sliding load door 18. Workpieces may be transported to and from manufacturing cell 10 on incoming and outgoing workpiece pallets 20, 22, respectively. For example, a forklift apparatus, automated guided vehicle ("AGV"), gantry equipment, conveyor equipment, turntable, and/or robotic equipment may be used to transport workpiece pallets 20, 22 to and from manufacturing cell 10 through vertical-sliding load door 18. Alternatively, such equipment may be used to transport workpieces to and from manufacturing cell 10 without the use of pallets. Moreover, any transport equipment used with manufacturing cell 10 may be automated and configured to interact with corresponding transport equipment of other manufacturing cells constituting part of a larger manufacturing operation.

Manufacturing cell 10 may include any type and number of manufacturing machines within enclosure 12, such as handling, manipulating, machining, joining, measuring, and/or inspecting equipment. In one embodiment, manufacturing cell 10 may include a fabrication system 100 for automated assembly and welding of workpieces. Specifically, fabrication system 100 may include various tools to make or change structures, machines, process equipment, and/or other hardware used in a wide range of industries. These industries may include, for example, mining, construction, farming, power generation, transportation, or any other industry known in the art. It is contemplated that fabrication system 100 may be used in any environment to hold any magnetic workpiece. In one embodiment, for example, fabrication system 100 may be employed to fabricate components of a wheel loader used in the construction industry.

As shown in the embodiment of FIG. 1, fabrication system 100 may include a handling robot 24 and a working robot 26 configured to operate in cooperation with a work holding system 28. Handling robot 24 may be configured to pick up workpieces arriving on incoming workpiece pallet 20 and position them on work holding system 28. Working robot 26 may be configured to machine, join, measure, and/or inspect workpieces positioned on work holding system 28 by handling robot 24.

Figure 2:
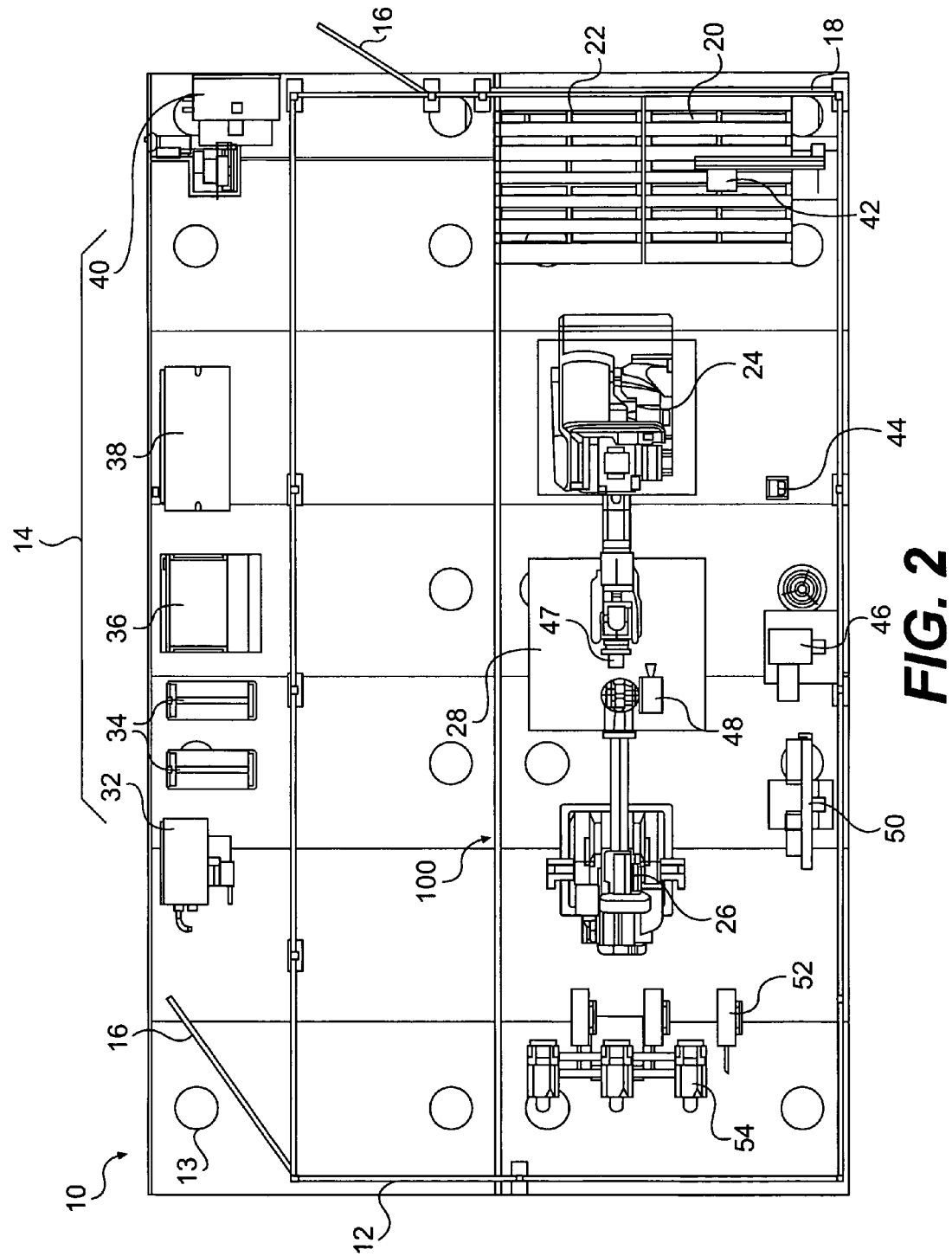
FIG. 2 is a top view of the exemplary disclosed manufacturing cell of FIG. 1.

FIG. 2 illustrates a top view of the manufacturing cell 10 depicted in FIG. 1. As shown in FIG. 2, control system 14 may include a power supply 32, dual industrial robot controllers ("IRCs") 34, a manufacturing cell controller 36, an electronics cabinet 38, and a user interface 40. Components of control system 14 may be in communication with each other, with machines of manufacturing cell 10, with machines of another cooperating manufacturing cell, with a control room, and/or with any communication network, such as a local area network ("LAN"), or wide area network ("WAN"). For example, components of control system 14 may be connected to machines of manufacturing cell 10 via electrical cables running through one or more cable routing access holes 13 disposed in the floor, ceiling, or walls of manufacturing cell 10. Alternatively, components of control system 14 may be in wireless communication with each other and with machines of manufacturing cell 10.

Within enclosure 12, manufacturing cell 10 may include a detection unit 42 positioned over incoming workpiece pallet 20. Detection unit 42 may be any type of device configured to detect the presence, type, orientation, and/or identity of a workpiece entering enclosure 12. For example, detection unit 42 may include a CCD camera, a laser camera, an infrared camera, a radar detector, a sonar detector, an optical scanner, an RFID reader, a scale, a tactile sensor, a proximity sensor, a motion sensor, an electromagnetic sensor, and/or any other suitable sensing device, or any combinations thereof. Detection unit 42 may be configured to transmit data detected from an incoming workpiece to control system 14 for processing. Alternatively, detection unit 42 may be configured to process at least part of the detected data before transmission to control system 14. Accordingly, detection unit 42 and control system 14, together, may be configured to determine any desired information about a workpiece that has arrived at manufacturing cell 10 for processing.

Handling robot 24 may be configured to reach between incoming workpiece pallet 20, work holding system 28, a calibrating park switch 44, and outgoing workpiece pallet 22. Handling robot 24 may include an end effector 47, which is configured to grasp and manipulate workpieces. For example, end effector 47 may include gripping jaws or clamps, electromagnetic devices, suction devices, adhesive devices, or any other suitable workpiece handling device. Handling robot 24 may be configured to dock its end effector 47 at park switch 44 for the purpose of storing, calibrating, and/or locating end effector 47 relative to a known point.

Working robot 26 may be configured to reach between work holding system 28 and a tool changing station 50. Working robot 26 may be configured to machine, join, measure, and/or inspect workpieces positioned on work holding system 28 by handling robot 24. Working robot 26 may include any type of end effector 48 which is desired to be used for these purposes, such as, for example, a saw, a milling tool, a drill, a laser cutter, an electron discharge machine (EDM), a welding torch, a soldiering tool, an adhesive applicator, a CCD camera, a tactile sensor, or any other suitable robotic end effector. Tool changing station 50 may be configured to facilitate exchanges between different end effectors 48 of working robot 26. Tool changing station 50 may also include a park switch for storing, calibrating, and/or locating end effector 48 of working robot 26 relative to a known point. In the event that working robot 26 is provided with a welding torch, working robot 26 may also be provided with automated welding mechanisms including floor-mounted wire spools 52 and stand-mounted wire feeders 54, both of which may be integrally controlled by control system 14 for supplying welding wire to a welding torch installed on working robot 26.

Manufacturing cell 10 may also include a tool finding system 46. Tool finding system 46 may be a tool center point ("TCP") system configured to locate and calibrate locations of end effectors 47, 48 of handling robot 24 and working robot 26, respectively. For example, tool finding system 46 may be configured to determine both a three-dimensional location and an angle of end effectors 47, 48. Tool finding system 46 may be configured to transmit end effector orientation data directly to control system 14 for processing, or it may perform at least some analysis of end effector orientation data before transmitting it to control system 14. In some embodiments, tool finding system 46 may also be configured to determine a three-dimensional location and orientation of one or more workpieces positioned on work holding system 28.

Figure 3:
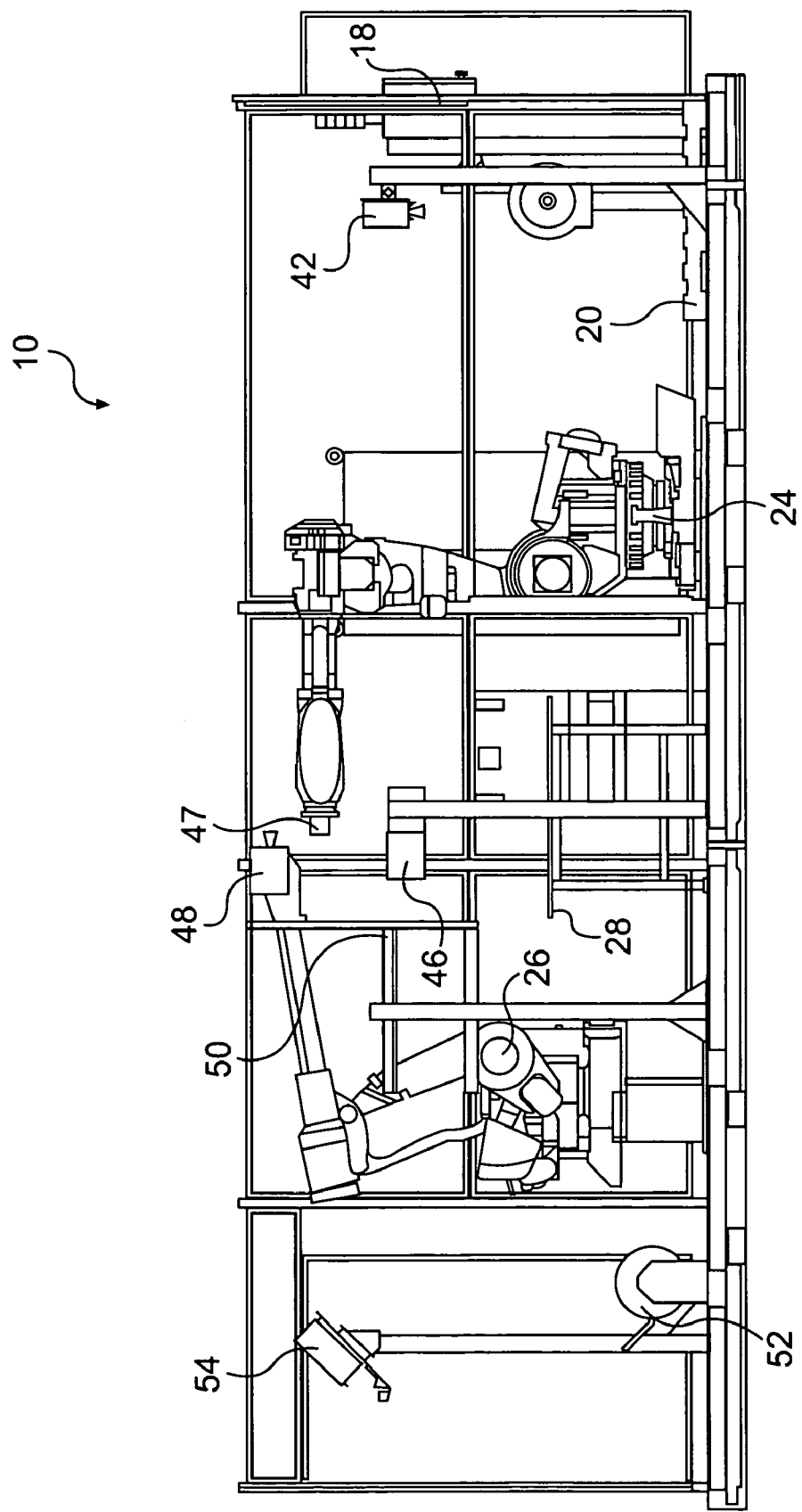
FIG. 3 is a side view of the exemplary disclosed manufacturing cell of FIG. 1.

FIG. 3 is a side view of the exemplary manufacturing cell 10 depicted in FIGS. 1 and 2. FIG. 3 illustrates detection unit 42 positioned over incoming workpiece pallet 20 adjacent to vertical-sliding load door 18. FIG. 3 also illustrates side views of handling robot 24, working robot 26, and their respective end effectors 47, 48. FIG. 3 also illustrates side views of tool finding system 46 aligned with work holding system 28; tool changing station 50 aligned with working robot 26; and floor-mounted wire spools 52 and stand-mounted wire feeders 54 corresponding to working robot 26.

Figure 4:
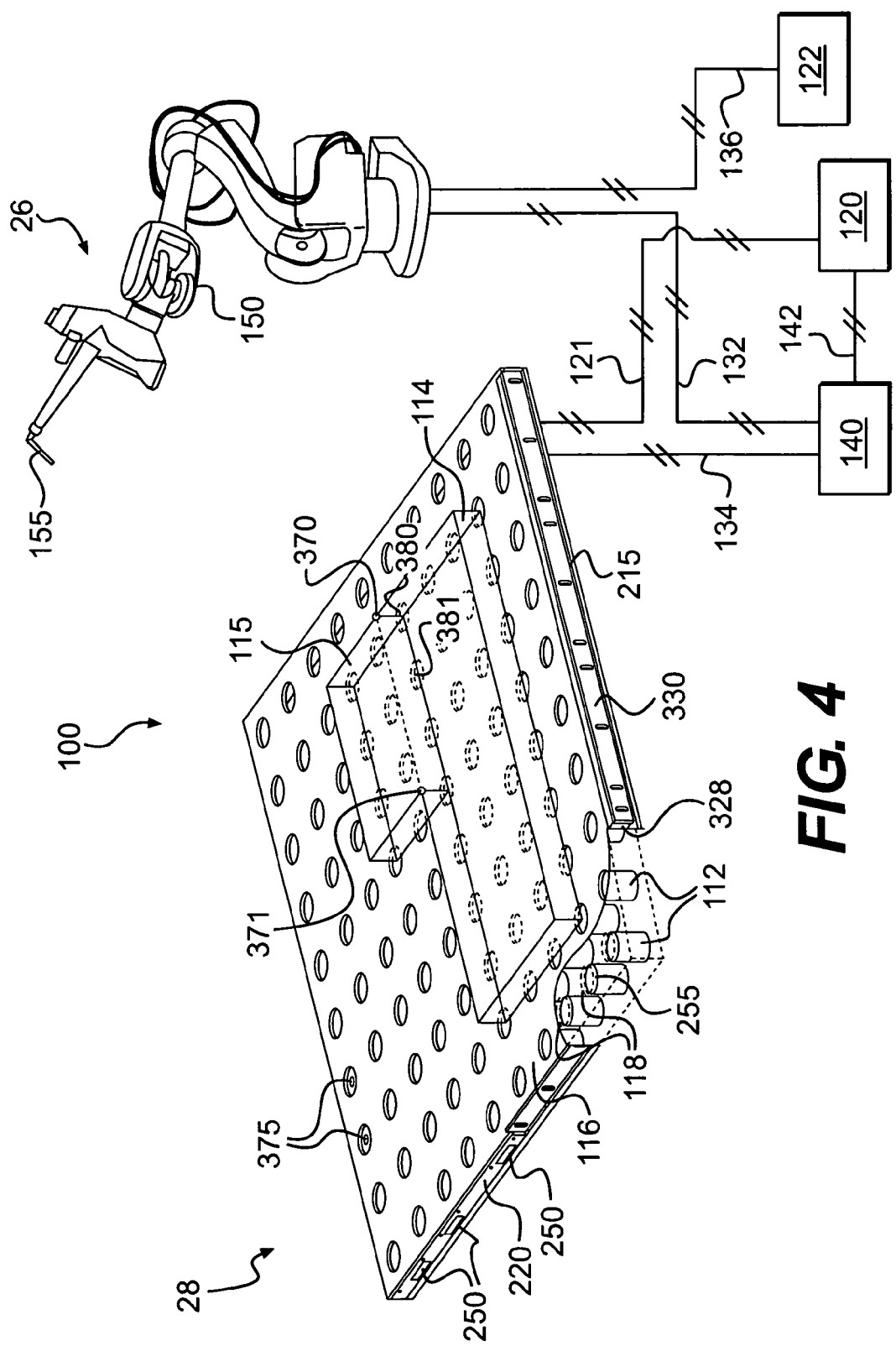
FIG. 4 is a diagrammatic illustration of an exemplary disclosed fabrication system for use with the exemplary manufacturing cell of FIGS. 1-3.

FIG. 4 illustrates an exemplary embodiment of a fabrication system 100, which may be advantageously incorporated in the manufacturing cell 10 disclosed in FIGS. 1-3. As shown in the embodiment of FIG. 4, fabrication system 100 may include a working robot 26, a work holding system 28, a first power source 120, a second power source 122, and a controller 140.

As shown in FIG. 4, work holding system 28 may be an electromagnetic work holding system and may be configured to secure a first magnetic workpiece 114 and a second magnetic workpiece 115 during various fabrication processes. For example, first magnetic workpiece 114 and second magnetic workpiece 115 may be secured by work holding system 28 for an arc welding process. Work holding system 28 may include a surface member 116 and a plurality of electromagnets 112 to secure magnetic workpieces 114, 115 to surface member 116. Each electromagnet 112 may be associated with a cutout 118 and may or may not be disposed, at least partially, within surface member 116. It is contemplated that each electromagnet 112 may or may not be flush with surface member 116. If each electromagnet 112 is not flush with surface member 116, a gap 255 may exist between the top of each electromagnet 112 and surface member 116. Gap 255 may provide a pocket of air to insulate each electromagnet 112 from any heat generated by the fabrication process.

Each electromagnet 112 may be a conventional electromagnet as known in the art and may be connected to a base plate 215. Base plate 215 may be constructed of an electrically conducting material, such as, for example, steel. Base plate 215 and surface member 116 may be included to provide a structural support to connect each electromagnet 112 to work holding system 28. For example, each electromagnet 112 may be bolted, riveted, welded, or fastened to base plate 215 using any other method apparent to one skilled in the art.

Each electromagnet 112 may have an activated state and a deactivated state and these states may be selectively adjusted by controller 140. In the activated state, an electrical energy may flow from first power source 120 to electromagnets 112 and may generate a magnetic field around each electromagnet 112. In the deactivated state, the magnetic field may be reduced from the activated state or may be eliminated by slowing or stopping the flow of electrical energy to each electromagnet 112 from first power source 120. It is contemplated that electrical energy supplied to each electromagnet 112 may be reversed for a short period of time prior to reducing or stopping the flow of electrical energy. This reversal of the flow of electrical energy may help to eliminate a residual magnetic field. It is further contemplated that the activation state of each electromagnet 112 may be selectively adjusted and that only electromagnets in the vicinity of magnetic workpieces 114, 115 may be commanded into an activated state by controller 140.

The magnetic field generated by each electromagnet 112 in an activated state may be strong enough to cause arc blow during the arc welding process. As such, each electromagnet 112 within a predefined proximity to the fabrication process may be selectively adjusted into a deactivated state. Alternatively, electromagnets outside of the predetermined proximity to the fabrication process may be commanded into an activated state to secure magnetic workpieces 114, 115 to surface member 116. It is contemplated that a variety of methodologies may be employed to activate and deactivate each electromagnet 112. For example, controller 140 may employ a rectangular coordinate system and track an arc welder performed automated fabrication process with respect to known locations of each electromagnet 112. Additionally or alternatively, sensors may be associated with the plurality of electromagnets 112 to sense a change in various parameters. Controlling the activation state of each electromagnet 112 will be discussed with respect to controller 140 below.

Work holding system 28 may also include a web plate 220, openings 250, a grounding plate 240 (shown in FIG. 5), and a plurality of hard stops 330. Web plate 220 may be constructed of an electrically conducting material such as, for example, steel. Web plate 220 may be disposed between surface member 116 and base plate 215 to provide structural rigidity to work holding system 28.

Web plate 220 may include various openings 250. Openings 250 may allow air to flow between surface member 116 and base plate 215 thereby allowing work holding system 28 to be cooled by convection. For example, gap 255 may facilitate convection by allowing a flow of air to pass between surface member 116 and base plate 215. It is contemplated that a cooling device may be added to work holding system 28 to facilitate cooling by forced convection. For example, the cooling device may facilitate cooling by forced convection using compressed air or may employ a fan to draw air flow through openings 250.

Grounding plate 240 may be connected to base plate 215 or any other conducting portion of work holding system 28 to direct an electrical current to second power source 122 through work holding system 28. For example, the electrical current may be conducted by base plate 215, web plate 220, surface member 116, and first magnetic workpiece 114 from an electrode tip 155. It is contemplated that grounding plate 240 may be omitted and an arc welding process may be directed through a second electrode (not shown) attached to working robot 26.

Hard stop 330 may be connected to work holding system 28 via base plate 215, web plate 220, linkage 328, and/or surface member 116. Hard stop 330 may by any block, flange, pin, or other hard surface configured to protrude above surface member 116, and be used to restrict movement of first magnetic workpiece 114. Further, hard stop 330 may also be use to align first magnetic workpiece 114. For example, first magnetic workpiece 114 may be positioned against hard stop 330 to align first magnetic workpiece 114 with respect to surface member 116 for the fabrication process. The vertical and horizontal location of hard stop 330 may also be reconfigured through the use of linkage 328, which may include any combination of gears, bearings, and/or linear drives configured to selectively position hard stop 330 relative to work holding system 28. Thus, linkage 328 may be used to control the positioning of workpieces aligned by hard stop 330. It will be appreciated that work holding system 28 may include any quantity or orientation of hard stops 330, as desired for aligning workpieces on work holding system 28.

Working robot 26 may include hardware associated with a welding, a machining, a cutting, and/or an assembly process. For example, working robot 26 may include hardware associated with arc welding, plasma cutting, or any other hardware known to one skilled in the art to be affected by electromagnetic fields. In the embodiment shown in FIG. 4, working robot 26 may include an arc welding machine having an electrode tip 155 operably attached to a robotic effector arm 150 to perform an automated arc welding process.

Robotic effector arm 150 may be capable of moving and manipulating electrode tip 155 of working robot 26 through space. Robotic effector arm 150 may include various hydraulic and electrical components configured to adjust a position of electrode tip 155. Further, movement of robotic effector arm 150 may be commanded by controller 140, which may be in communication with other components of control system 14. Electrode tip 155 may be used to pass a flow of electrical energy through first magnetic workpiece 114 to shape, join, cut, or otherwise manipulate first magnetic workpiece 114. It is contemplated that electrode tip 155 may receive the flow of electrical energy from second power source 122 through an electrical line 136. Further, it is contemplated that working robot 26 may include a consumable or non consumable electrode. One skilled in the art will recognize that robotic effector arm 150 and electrode tip 155 may embody various configurations and may include various additional components which may be used to move electrode tip 155 through space. It is contemplated that working robot 26 may include any conventional apparatus configured to manipulate magnetic workpieces 114, 115.

First power source 120 may provide a source of electrical energy to work holding system 28 via an electrical supply line 121. It is contemplated that first power source 120 may provide various sources of electrical energy and that those sources may be either alternating current or direct current. For example, first power source 120 may be connected to provide electrical energy to controller 140 via electrical supply line 142. It is further contemplated that work holding system 28 and working robot 26 may be connected to the same power source.

Controller 140 may embody a single microprocessor, or multiple microprocessors for controlling and operating components of fabrication system 100. Numerous commercially available microprocessors may be configured to perform the functions of controller 140. It should be appreciated that controller 140 could readily embody a general microprocessor capable of controlling numerous operating functions. Controller 140 may include a memory, a secondary storage device, a processor, and any other components for running an application. Various other circuits may be associated with controller 140 such as a power source circuit, a signal conditioning circuit, and other types of circuits. Controller 140 may communicate with work holding system 28 via a work holding system communication line 134 and to working robot 26 via a fabrication apparatus communication line 132.

One or more maps relating various system parameters may be stored in the memory of controller 140. Each of these maps may include a collection of data in the form of tables, graphs, equations and/or another suitable form. The maps may be automatically or manually selected and/or modified by controller 140 to affect movement of working robot 26 or activation state of each electromagnet 112. For example, one such map, that is, a control map, may include a predetermined adjustment sequence. That is, the controller may include a collection of commands associated with the movement of electrode tip 155. That is, the control map may be stored within the memory of controller 140 and may include commands for a specific welding process. The specific welding process may contain various collections of information such as the size and location of the magnetic workpieces 114, 115 with respect to the work holding system 28. In an addition, controller 140 may also include a positional map. The positional map may include the relative positions of each electromagnet 112, that is, the positional maps may include the position of each electromagnet 112 disposed within the work holding system 28.

Controller 140 may be configured to selectively adjust the activation state of each electromagnet 112 and each hard stop 330. For example, after magnetic workpieces 114, 115 have been positioned with respect to work holding system 28, controller 140 may activate one or more electromagnets 112. Upon securing magnetic workpieces 114, 115 to the work holding system 28, controller 140 may command operation of the fabrication process. In this example, controller 140 may command operation of an arc welding process or a material removal process from a first position 370 to a second position 371. That is, controller 140 may command electrode tip 155 to weld magnetic workpieces 114, 115 from first position 370 to second position 371 while welding magnetic workpieces 114, 115 together. Controller 140 may also be used to control the location of hard stops 330, for example, based on workpiece positions and welding processes, as desired.

By using a coordinate system and comparing the commands within the control map against the positional map, controller 140 may be able to determine a movement of electrode tip 155 to a position within the predetermined proximity of a first electromagnet 380. Upon making this determination, controller 140 may command first electromagnet 380 into the deactivated state. While in the deactivated state, first electromagnet 380 may not generate a strong magnetic field and, thus may not adversely affect the arc welding process. As the electrode tip 155 moves out of the predetermined proximity of the first electromagnet 380 and into the predetermined proximity of a second electromagnet 381, first electromagnet 380 may be commanded into the activated state and second electromagnet 381 may be commanded into the deactivated state.

In addition to and/or alternatively, work holding system 28 may include a sensor associated with the plurality of electromagnets 112. These sensors may be configured to sense a change in parameters indicative of tool position, such as, for example, a change in temperature. That is, a temperature sensor 375 may be associated each electromagnet 112 and may generate a signal based on a change in temperature associated with the arc welding process and may be disposed within the predetermined proximity of each electromagnet 112. Because the arc welding process generates heat as it welds, temperature sensor 375 may detect a rapid increase in temperature as electrode tip 155 enters the predetermined proximity. It is contemplated there may be fewer temperature sensors 375 than electromagnets 112, for example, one temperature sensor 375 may be associated with more than one electromagnet 112. It is further contemplated that controller 140 may adjust the activation state of multiple electromagnets 112 based on a signal from one temperature sensor or visa versa.

The signals generated by temperature sensor 375 may be directed toward controller 140. Controller 140 may determine, based upon the signal, that an arc welding process has entered the predetermined proximity. Upon determining that the arc welding process has entered the predetermined proximity, controller 140 may selectively deactivate each electromagnet 112 associated with temperature sensor 375. Likewise, when electrode tip 155 moves away from temperature sensor 375, the temperature may drop and temperature sensor 375 may then generate a signal indicative of a reduced temperature. Upon receiving the signal indicative of a reduced temperature, controller 140 may command each electromagnet 112 associated with temperature sensor 375 into the activated state. It is contemplated that controller 140 may use maps in conjunction with an automated fabrication process and may use temperature sensor 375 in conjunction with either an automated fabrication process or a manual fabrication process. It is further contemplated that work holding system 28 may be fixed, for example, to a table, work bench, or other relatively stable structure, or may be fixed to a moveable structure such as, for example a robotic arm.

Figure 5:
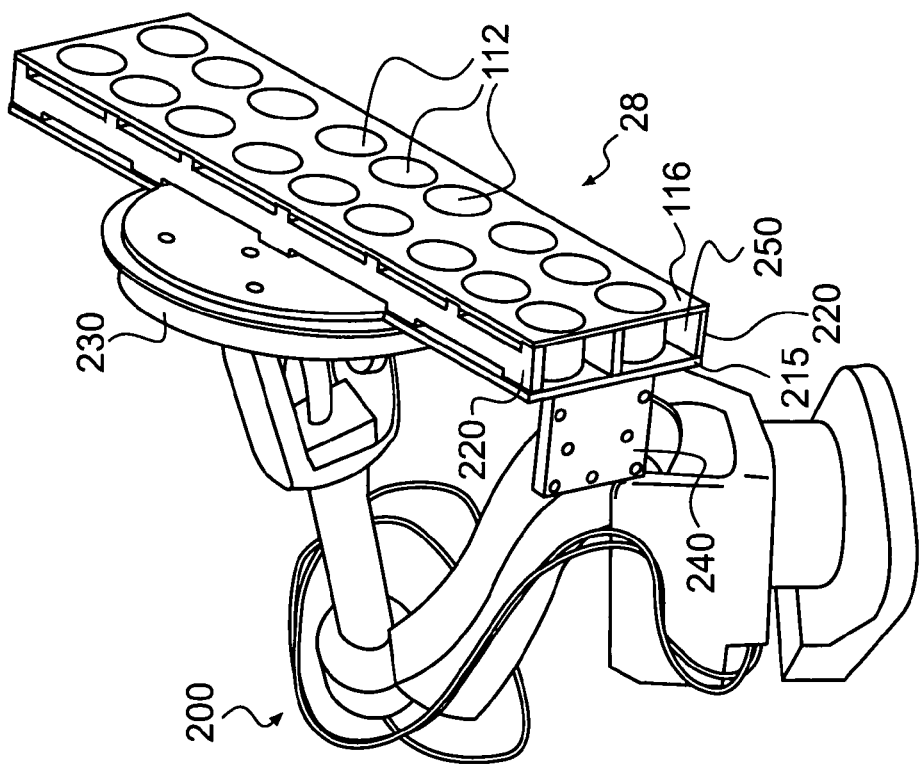
FIG. 5 is a diagrammatic illustration of an exemplary disclosed work holding system for use with the exemplary fabrication system of FIG. 4.

FIG. 5 illustrates work holding system 28 attached to a robotic effector arm 200. Robotic effector arm 200 may be configured to move work holding system 28 and manipulate first magnetic workpiece 114 (FIG. 4) through space. It is contemplated that robotic effector arm 200 may move first magnetic workpiece 114 with respect to electrode tip 155 (FIG. 4) or that both robotic effector arm 200 and electrode tip may move with respect to a fixed point of reference.

As previously described above with respect to working robot 26, robotic effector arm 200 may include various hydraulic and electrical components and may be commanded by controller 140 to move work holding system 28. In addition to the components shown in FIG. 4, work holding system 28 may also include various other components. Particularly, work holding system 28 may include a liquid cooling device 230.

Liquid cooling device 230 may be disposed between an electrical insulator (not shown) and work holding system 28. The electrical insulator may be constructed of a thermal plastic and may be sensitive to the high temperatures created by the arc welding process. Liquid cooling device 230 may be configured to cool the electrical insulator and may include various components to remove heat. For example, liquid cooling device 230 may circulate water through a vane (not shown) to remove heat from work holding system 28. It is contemplated that various devices may be configured to cool work holding system 28 and and/or robotic effector arm 200, or that liquid cooling device 230 may be omitted.

It is contemplated that additionally or alternatively, working robot 26 may embody various tools for various other fabrication processes. These fabrication processes may include welding, machining, cutting, assembly, or any other fabrication process known in the art. For example, electrode tip 155 may be replaced with a cutting bit for a machining process. In this example, electromagnets 112 may switch from the activated state to the deactivated state as disclosed above so that the machine process may not be adversely affected by magnetic fields. Specifically, electromagnets 112 may be switched to the deactivated state so that magnetic workpieces 114, 115 may not collect debris during the machining process. Further, liquid cooling device 230 may be included and may remove heat associated with the friction caused during the machining process.

INDUSTRIAL APPLICABILITY

Manufacturing cell 10 and fabrication system 100 may be used to make or change structures, machines, equipment, and/or other hardware or workpieces for a wide range of industries. These industries may include, for example, mining, construction, farming, power generation, transportation, or any other industry known in the art. It is contemplated that manufacturing cell 10 may be incorporated into any manufacturing operation. For example, manufacturing cell 10 may be integrated with a plurality of other similar or alternative manufacturing cells as part of a large-scale assembly line. However, it will also be appreciated that manufacturing cell 10 may be configured to manufacture an entire component or assembly of components, without the assistance of any external manufacturing equipment. For example, manufacturing cell 10 may be implemented as a small-batch, customization or just-in-time ("JIT") manufacturing process configured to produce an intermediate or final product. Thus, the exemplary disclosed systems may provide for improved manufacturing processes, the operation of which will now be explained with respect to exemplary method 500.

Figure 6:
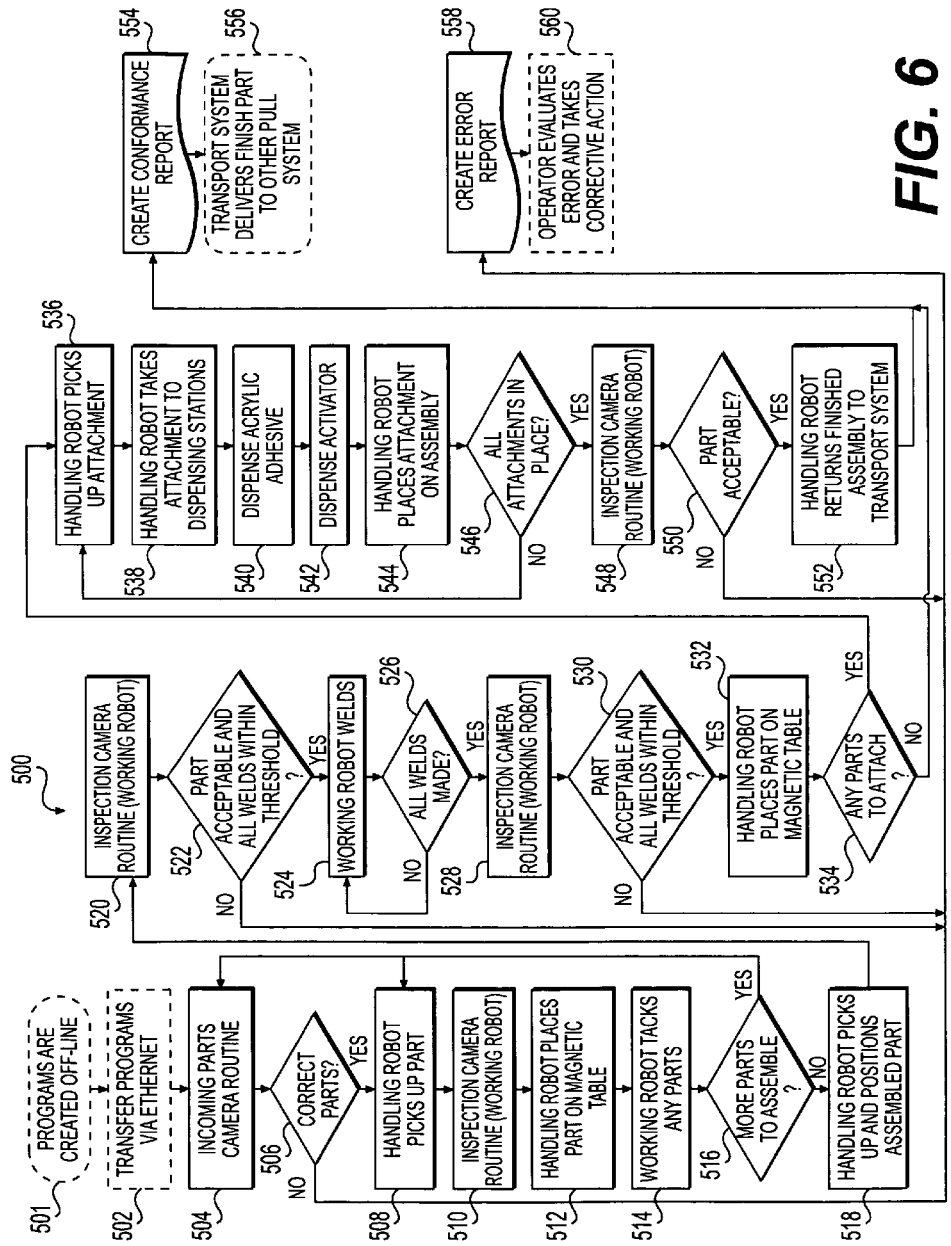
FIG. 6 is a flow diagram illustrating an exemplary control method for using the exemplary manufacturing cell disclosed in FIGS. 1-3.

Referring now to FIG. 6, a method 500 of assembling and welding workpieces may begin with the creation of control programs using an off-line computer (Step 501). An operator may use any suitable type of computer software for designing components, planning manufacturing steps, programming robotic operations, and programming any portion of control system 14 of manufacturing cell 10. For example, the operator may use CAD/CAM software to plan robotic manufacturing processes. The operator may transfer these control programs from a computer to control system 14 via Ethernet, or any other suitable communication network or data storage device (Step 502).

Once control system 14 has been provided with suitable control programs, method 500 may begin operating manufacturing cell 10 to receive and process workpieces by executing an incoming parts camera routine (Step 504). Specifically, one or more workpieces may enter manufacturing cell 10 through vertical-sliding load door 18 on an incoming workpiece pallet 20. Detection unit 42 may collect data regarding a workpiece positioned on incoming workpiece pallet 20 and send it to control system 14. Detection unit 42 and/or control system 14 may then identify one or more parts positioned on incoming workpiece pallet 20 and determine whether at least one of the parts is correct for a desired routine (Step 506). For example, control system 14 may locate corners, or any other distinguishing features of a part, using data collected by detection unit 42. A part may be correct if it is desired to be placed on work holding system 28 by working robot 24 for assembly with another part. If there are no correct parts on incoming workpiece pallet 20, control system 14 may create an error report (Step 558) and prompt an operator to evaluate the error and take corrective action (Step 560).

If there is at least one correct part on incoming workpiece pallet 20, handling robot 24 may pick up the part using its end effector 47 (Step 508). For example, handling robot 24 may activate one or more electromagnets in its end effector 47 and then contact the correct part. Working robot 26 may then perform an inspection camera routine on the part being handled by handling robot 24 (Step 510). For example, end effector 48 of working robot 26 may retrieve a CCD camera from tool changing station 50 and use it to identify the part and its orientation relative to end effector 47 or another known point. Handling robot 24 may then place the part on a magnetic table, such as the work holding system 28 described with respect to FIG. 4 (Step 512). Specifically, handling robot 24 may either orient the part relative to work holding system 28 for it to be desirably mated with a subsequent part, or relative to a part already positioned on work holding system 28.

If there are any parts already positioned on work holding system 28, to which the part is desired to be joined, working robot 26 may then tack weld the two parts together, in their desired orientations as situated by handling robot 24 and work holding system 28 (Step 514). Specifically, working robot 26 may retrieve a welding torch from tool changing station 50. Working robot 26 may begin tack welding one or more parts by touch sensing the part locations and orientations. Working robot 26 may then make a plurality of short welds in predetermined intervals along the length of a desired weld interface so as to form a tacked part assembly. This step of welding may be performed in cooperation with each of handling robot 24, working robot 26, work holding system 28, and control system 14, as will be described more specifically with respect to FIG. 7. For instance, electromagnets associated with work holding system 28 may be modulated depending on the location of a welding torch manipulated by working robot 26. Control system 14 may monitor current, voltage, wire feed speed, and gas flow as working robot 26 performs welding with its end effector 47. Control system 14 may then determine whether there are any additional parts to assemble (Step 516). If there are additional parts to assemble to the tacked part assembly positioned on work holding system 28, then control system 14 may return to either the incoming parts camera routine (Step 504) or the handling robot pick-up routine (Step 508). Specifically, handling robot 24 may pick up another part from incoming workpiece pallet 20 based on part data obtained during the previous part pick-up process (Step 508), or control system 14 and detection unit 42 may perform another incoming parts routine (Step 504).

If there are no additional parts to assemble to the tacked part assembly positioned on work holding system 28, then handling robot 24 may pick up and re-position the tacked part assembly on work holding system 28 (Step 518). Specifically handling robot 24 may position the tacked part assembly on work holding system 28 in a way that facilitates inspection of the tacked part assembly. Working robot 26 may then perform an inspection camera routine on the tacked part assembly (Step 520). For example, end effector 48 of working robot 26 may retrieve a CCD camera from tool changing station 50 in order to measure tacked part dimensions and assembly dimensions. Thus, working robot 26 may measure the compliance of the tacked part assembly relative to accepted tolerances, as well as the extent of any distortion resulting from the assembly process. Control system 14 may then determine whether the tacked part assembly is acceptable and whether all tack welds are within a predetermined quality threshold (Step 522). If either the tacked part assembly or tack welds are not acceptable, then control system 14 may create an error report (Step 558).

If the tacked part assembly and tack welds are acceptable, then working robot 26 may proceed with fully welding the part assembly, as desired (Step 524). Specifically, working robot 26 may retrieve a welding torch from tool changing station 50 and weld all desired interfaces between parts of the tacked part assembly. This step of welding may be performed in cooperation with each of handling robot 24, working robot 26, work holding system 28, and control system 14, as will be described more specifically with respect to FIG. 7. For instance, electromagnets associated with work holding system 28 may be modulated depending on the location of a welding torch manipulated by working robot 26. Control system 14 may monitor current, voltage, wire feed speed, and gas flow as working robot 26 performs welding with its end effector 47. Control system 14 may then determine whether all desired welds have been made (Step 526). If all desired welds have been completed, then working robot 26 may perform another inspection camera routine (Step 528). For example, end effector 48 of working robot 26 may retrieve a CCD camera from tool changing station 50 in order to measure part dimensions and assembly dimensions of the welded part assembly. Control system 14 may then determine whether the welded part assembly is acceptable and whether all welds are within a predetermined quality threshold (Step 530). If either the welded part assembly itself or its welds are not acceptable, then control system 14 may create an error report (Step 558).

If the welded part assembly and welds are acceptable, then handling robot 24 may re-position the welded part assembly on work holding system 28, as desired (Step 532). In one embodiment, control system 14 may then determine whether there are additional manufacturing processes to perform on the welded part assembly, such as, for example, whether there are any parts to attach to the assembly by means other than welding (Step 534). If there are no additional manufacturing processes to perform on the welded part assembly, then control system 14 may create a conformance report (Step 554) and a transport system may deliver the finished part to other pull systems of a larger manufacturing process (Step 556). For example, handling robot 24 may pick up the welded part assembly and position it on outgoing workpiece pallet 22, by which it may leave manufacturing cell 10.

If there are additional manufacturing processes to perform on the welded part assembly, such as the adhesion of attachments to the welded assembly, handling robot 24 may pick up an attachment, for example, from incoming workpiece pallet 20 (Step 536). Although exemplary method 500 will be described with respect to adhesion of additional attachments to the welded assembly, one of skill in the art will appreciate that any other desired manufacturing process may be performed on the welded assembly. For example, the welded assembly may be machined, drilled, heat treated, and/or coated. Once handling robot 24 has retrieved an attachment to adhere to the welded assembly, handling robot 24 may take the attachment to one or more adhesive dispensing stations (not depicted) (Step 538). In one embodiment, at least one of the adhesive dispensing stations may dispense acrylic adhesive on the attachment (Step 540), and at least another one of the adhesive dispensing stations may dispense an activator on the attachment where the acrylic adhesive was dispensed on the attachment (Step 542). The adhesive may be toughened acrylic adhesive, thermosetting adhesive, elastomeric adhesive, pressure sensitive adhesive, and/or rapid setting adhesive, for example. Handling robot 24 may then press the adhesive surface of the attachment against a desired portion of the welded assembly (Step 544). If there additional attachments to adhere to the welded assembly, handling robot 24 may pick up another attachment to adhere (Step 536).

If all of the desired attachments are in place, then working robot 26 may perform another inspection camera routine (Step 548). For example, end effector 48 of working robot 26 may use a CCD camera to measure attachment dimensions and assembly dimensions. Thus, working robot 26 may measure the compliance of the welded part assembly and attachments in relation to accepted tolerances and determine the extent of any distortion resulting from the assembly process. Control system 14 may then determine whether the welded part assembly and attachments are acceptable and within a predetermined quality threshold (Step 550). If the welded part assembly and attachments are not acceptable, then control system 14 may create an error report (Step 558). If the welded part assembly and attachments are acceptable, then control system 14 may create a conformance report (Step 554) and a transport system may deliver the finished part to other pull systems of a larger manufacturing process (Step 556). For example, handling robot 24 may pick up the welded assembly and position it on outgoing workpiece pallet 22, by which it may leave manufacturing cell 10.

Thus, method 500 may be an advantageous method of using manufacturing cell 10 for assembling and welding a plurality of workpieces in an efficient and automated manner. Because the components of manufacturing cell 10 may be fully automated, it may advantageously improve the efficiency, precision, and accuracy of machining and assembling processes carried out therein. Moreover, because fabrication system 100 may include a handling robot 24 and a working robot 26 operating in cooperation with work holding system 28, the need for dedicated fixturing may be eliminated.

Fabrication system 100 may be used in any environment to hold any magnetic workpiece. For example, the disclosed method and apparatus may be used with processes that may be adversely affected by magnetic fields. As disclosed above, work holding system 28 may employ one or more electromagnets 112 that are configured to be individually activated by controller 140 between at least two activation states. Each electromagnet 112 commanded into the activated state may generate a magnetic field to hold first magnetic workpiece 114 to surface member 116. Conversely, when commanded into the deactivated state, each electromagnet 112 may not generate the electromagnetic field and, thus, may not interfere with the arc welding process or another fabrication process.

Figure 7:
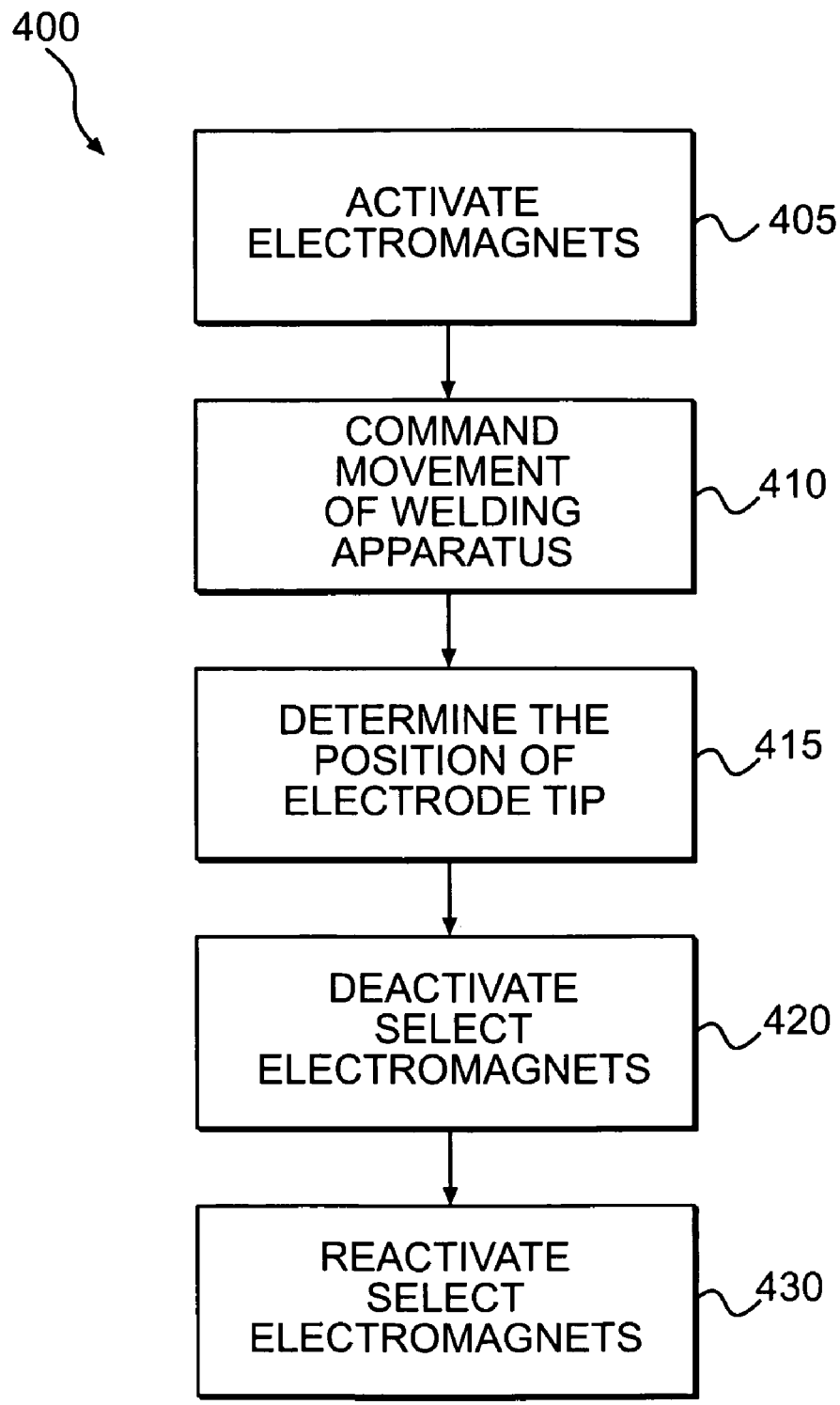
FIG. 7 is a flow diagram illustrating an exemplary control method for using the exemplary fabrication system disclosed in FIG. 4.

Referring now to the method 400 of FIG. 7, beginning with each electromagnet 112 in the deactivated state, first magnetic workpiece 114 may be positioned onto work holding system 28. For this example, work holding system 28 may embody a workbench. In this embodiment, first magnetic workpiece 114 may be positioned onto the workbench against hard stop 330. Once first magnetic workpiece 114 is in place, each electromagnet 112 may be commanded into the activated state by controller 140 (Step 405). After electromagnets 112 have been commanded into the activated state, a fabrication process may begin, for this example, the fabrication process may be arc welding. It is contemplated that only electromagnets 112 within a proximity of magnetic workpieces 114, 115 may be activated. Further, electromagnets 112 that are not positioned within the proximity of the magnetic workpieces 114, 115 may remain in a deactivated state.

As the arc welding process begins, controller 140 may command movement of electrode tip 155 with respect to the workbench and first magnetic workpiece 114. As electrode tip 155 comes into the proximity of each activated electromagnet 112, each electromagnet 112 may be commanded into a deactivated state. For example, referring to FIG. 4, as electrode tip 155 comes into the proximity of first electromagnet 380, first electromagnet 380 may be commanded into the deactivated state until electrode tip 155 leaves the proximity of first electromagnet 380.

Controller 140 may be programmed to weld various magnetic workpieces secured to work holding system 28 by one or more electromagnets 112. Welding commands may be read from one or more maps stored within the memory of controller 140. Controller 140 may command movement of working robot 26 (Step 410) from first position 370 to second position 371 (see FIG. 4). To control the movement of working robot 26, a coordinate system may be used. In addition to moving electrode tip 155, the coordinate system may also be used by controller 140 to determine the position of electrode tip 155 with respect to each electromagnet 112 (Step 415). Particularly, if controller 140 determines that electrode tip 155 is within the proximity of one or more electromagnets 112, controller 140 may command each electromagnet 112 to deactivate. For example, as electrode tip 155 moves from first position 370 to second position 371 it may come into the proximity of first electromagnet 380 and second electromagnet 381.

When controller 140 determines that electrode tip 155 is within the proximity of first electromagnet 380 and/or second electromagnet 381, controller 140 may selectively switch first and/or second electromagnets 380, 381 to the deactivated state (Step 420). While in the deactivated state, first and/or second electromagnets 380, 381 may not generate the magnetic field and, therefore, may not adversely affect the welding process. After controller 140 has commanded electrode tip 155 to move out of the proximity of first and/or second electromagnet 380, 381, first and/or second electromagnet 380, 381 may be reactivated (Step 430). That is, first and/or second electromagnets 380, 381 may be commanded back into the activated state. It is contemplated that controller 140 may selectively activate and deactivate any number of electromagnets 112 that may be affected by electrode tip 155. Such deactivating may occur consecutively as electrode tip 155 moves across magnetic workpieces 114, 115. Further, a plurality of electromagnets 112 or all of the potentially affected electromagnets 112 may be deactivated as electrode tip 155 does work on the magnetic workpieces 114, 115. In each case, controller 140 will leave enough electromagnets activated so that the magnetic workpieces 114, 115 remains adequately secured to work holding system 28. It is further contemplated that work holding system 28 may be combined with the robotic effector arm 200 as shown in FIG. 5. Robotic effector arm 200 may be commanded by controller 140 to move work holding system 28 and an attached magnetic workpiece with respect to another work holding system 28 or with respect to an electrode tip 155.

As described herein, each electromagnet 112 may be selectively activated and selectively deactivated by controller 140. It is contemplated that changing the activation state of electromagnets 112 may include reducing the magnetic field strength, reversing the magnetic field polarity or eliminating the magnetic field completely. Since controller 140 may selectively adjust the activation state of each electromagnet 112, adverse affects caused by the magnetic fields generated by each electromagnet 112 on fabrication processes may be avoided. For example, the disclosed method and apparatus may reduce or eliminate arc blow during arc welding processes. This reduction or elimination of arc blow may reduce excessive spatter, incomplete fusion, and weld porosity.

It will be apparent to those skilled in the art that various modifications and variations can be made to the disclosed assembly, welding, and work holding systems without departing from the scope of the disclosure. Other modifications will be apparent to those skilled in the art from consideration of the specification and practice of the assembly, welding, and work holding systems disclosed herein. It is intended that the specification and examples be considered as exemplary only, with a true scope of the invention being indicated by the following claims and their equivalents.

What is claimed is:

1. A system for assembling workpieces, the system comprising:
   a pallet for receiving incoming workpieces;
   a workpiece holder having a plurality of electromagnets;
   a handling robot configured to transport incoming workpieces from the pallet to the workpiece holder; and
   a controller in communication with the workpiece holder and the handling robot; wherein the controller is configured to determine an orientation of a workpiece positioned on the workpiece holder, and to selectively adjust an activation state of certain ones of the plurality of electromagnets of the workpiece holder based upon the orientation of the workpiece.

2. The system of claim 1, further comprising a working robot configured to operate relative to workpieces positioned on the workpiece holder; wherein the controller is in further communication with the working robot.

3. The system of claim 2, wherein the working robot is configured to perform one or more of inspecting, measuring, photographing, welding, drilling, and machining of workpieces positioned on the workpiece holder.

4. The system of claim 2, further including a tool changing station having a camera and a welding torch; wherein the working robot is configured to selectively retrieve the camera or welding torch for operating relative to workpieces positioned on the workpiece holder.

5. The system of claim 1, wherein the electromagnets are connected to a support structure and configured to fix a workpiece to the support structure, and the support structure includes hard stops configured to orient a workpiece fixed to the support structure.

6. The system of claim 5, wherein the support structure includes a fixed table or a movable robotic arm.

7. The system of claim 1, further comprising a detection unit configured to collect data about incoming workpieces received on the pallet.

8. The system of claim 7, wherein the detection unit is a camera.

9. The system of claim 7, wherein the controller is further configured to determine an identity of the workpiece and to operate the workpiece holder and the handling robot based upon the identity of the workpiece.

10. The system of claim 2, further comprising a welding wire feeder in communication with the controller; wherein the controller is configured to operate the welding wire feeder in cooperation with the working robot when the working robot is manipulating a welding torch.

* * * * *